Dec. 23, 1947.   J. P. FELLABAUM   2,433,268
TANDEM AXLE RUNNING GEAR FOR TRANSPORTATION VEHICLES
Filed May 8, 1944   3 Sheets-Sheet 1
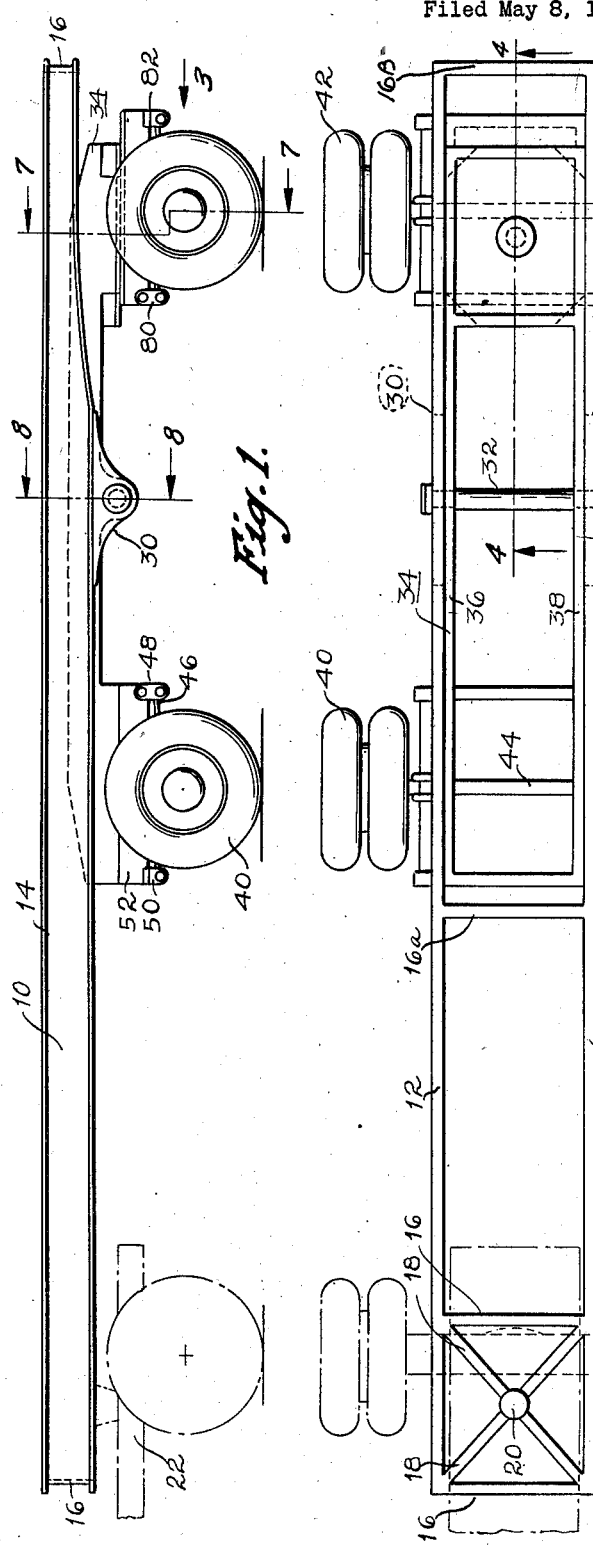
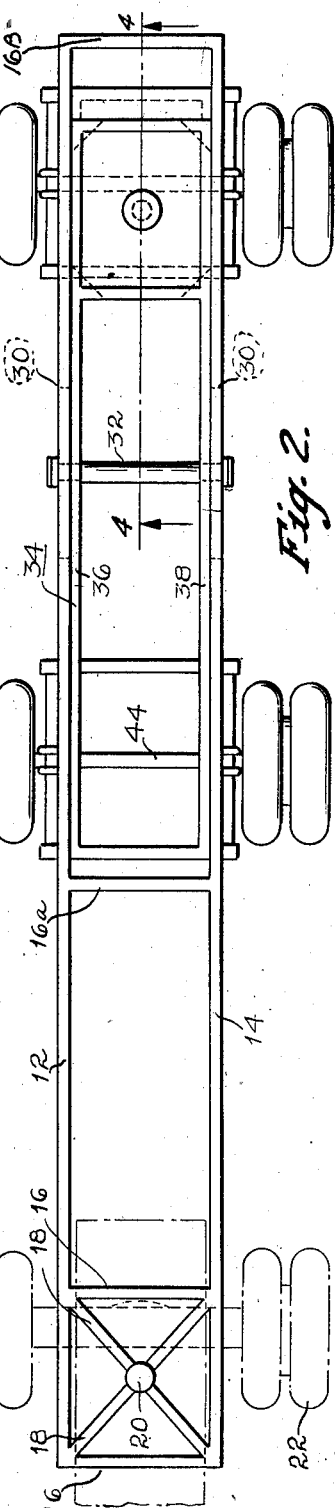
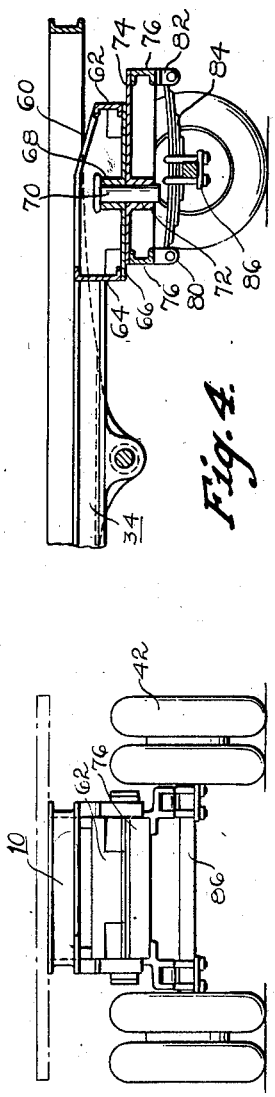

Dec. 23, 1947.    J. P. FELLABAUM    2,433,268
TANDEM AXLE RUNNING GEAR FOR TRANSPORTATION VEHICLES
Filed May 8, 1944    3 Sheets-Sheet 2
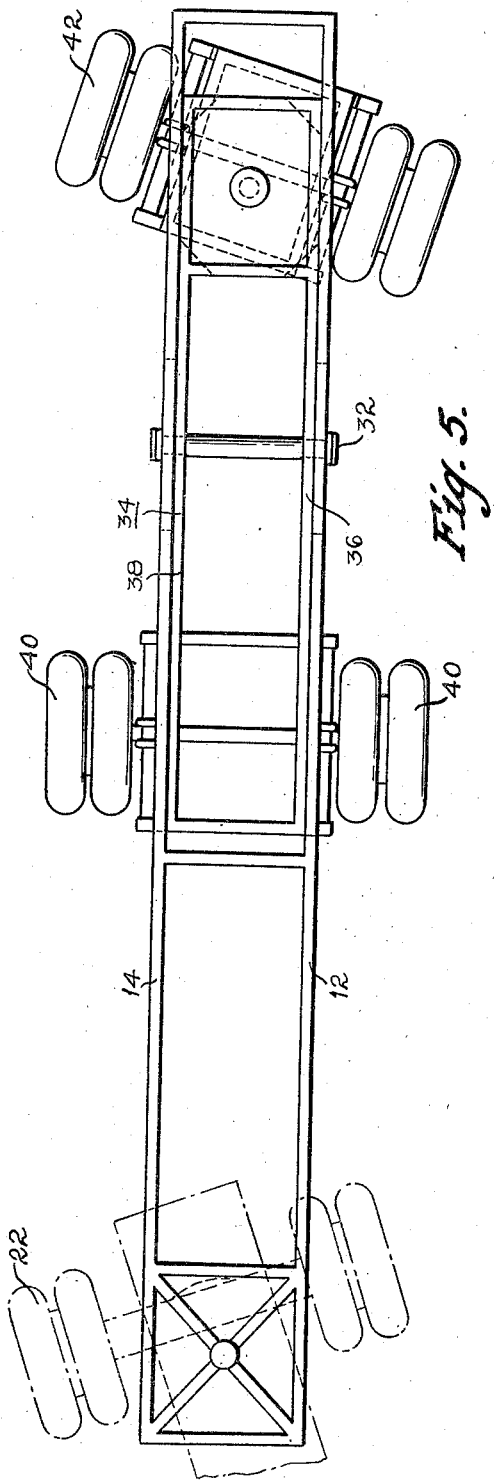
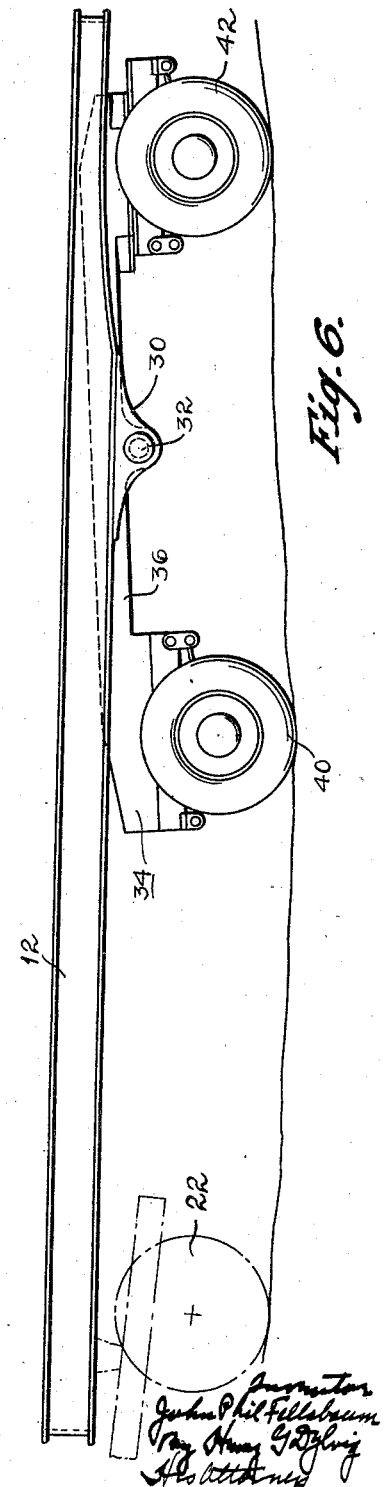

Dec. 23, 1947.　　　J. P. FELLABAUM　　　2,433,268
TANDEM AXLE RUNNING GEAR FOR TRANSPORTATION VEHICLES
Filed May 8, 1944　　　3 Sheets-Sheet 3

Patented Dec. 23, 1947

2,433,268

UNITED STATES PATENT OFFICE 2,433,268

TANDEM AXLE RUNNING GEAR FOR TRANSPORTATION VEHICLES

John Phil Fellabaum, Dayton, Ohio

Application May 8, 1944, Serial No. 534,643

6 Claims. (Cl. 280—104.5)

This invention relates to transportation vehicles and more particularly to the structure of same.

An object of this invention is to provide a transportation vehicle such as a trailer for use with a tractor wherein the load on the trailer is efficiently distributed beween several pairs of wheels. The pairs may be substantially equally spaced so as to distribute the load uniformly over the road bed.

Another object of this invention is to provide a transportation vehicle having a main frame and at least two pairs of wheels for supporting the main frame through a sub-frame mounted for oscillatory movement and nestled with respect to the main frame.

Another object of this invention is to provide a main frame and a sub-frame for a transportation vehicle, wherein the sub-frame is pivotally attached to the main frame and the frames are nestled with respect to each other, so that the main frame functions as a guide for the sub-frame.

Another object of this invention is to provide a transportation vehicle having a main frame and a sub-frame arranged to have a height substantially the same as though no sub-frame were used.

Other objects and advantages reside in the construction of parts, the combination thereof and the mode of operation, as will become more apparent from the following description.

In the drawings,

Figure 1 is a side elevational view of the preferred embodiment of a trailer.

Figure 2 is a top plan view of the embodiment shown in Figure 1.

Figure 3 is a rear end view looking in the direction of the arrow shown in Figure 1.

Figure 4 is a fragmentary, sectional view taken substantially on the line 4—4 of Figure 2.

Figure 5 is another top plan view similar to the disclosure in Figure 2, showing the position of the bogie wheels when the tractor is turned in the direction shown in dotted lines.

Figure 6 is a side elevational view similar to Figure 1, showing the sub-frame oscillating with respect to the main frame to accommodate irregularities in the highway.

Figure 7:
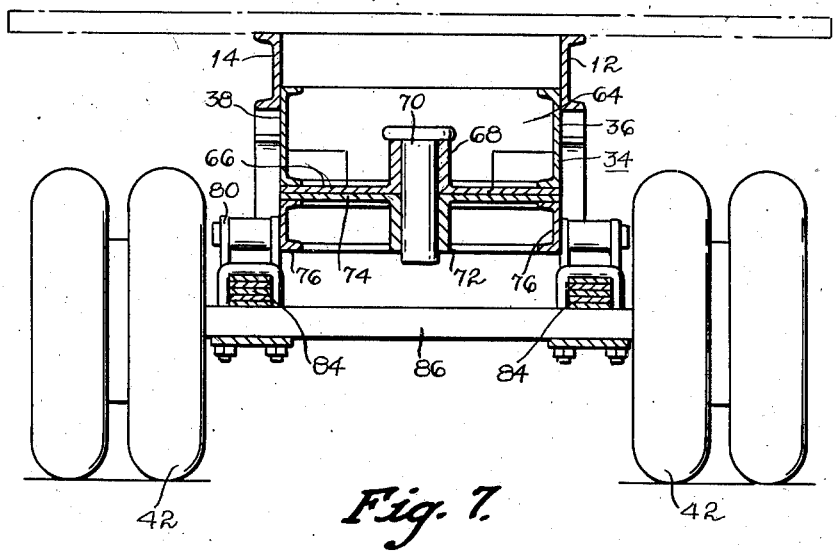
Figure 7 is a cross sectional view taken substantially on the line 7—7 of Figure 1.
Figure 8:
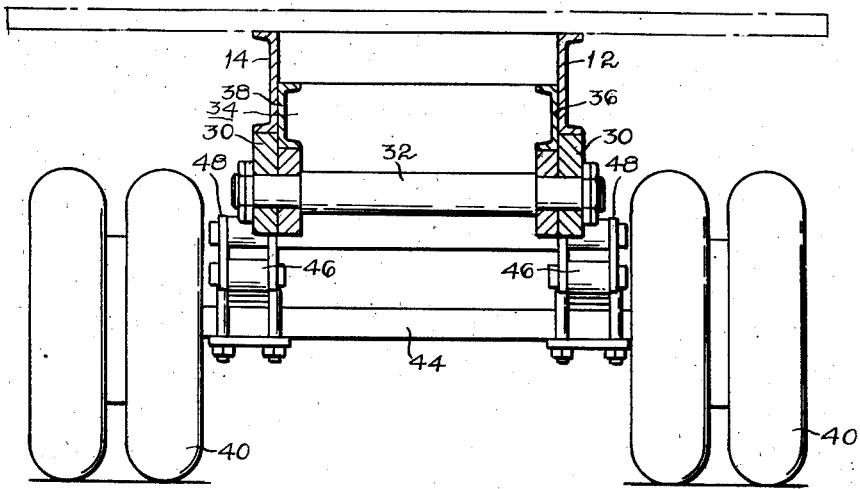
Figure 8 is a cross sectional view taken substantially on the line 8—8 of Figure 1.

Referring to the drawings, the trailer includes a main body 10, consisting of a pair of longitudinally disposed rails 12 and 14, transverse members 16 and diagonally disposed reenforcing members 18, adapted to receive a king bolt 20 at the point of intersection. The king bolt 20 is used in connecting the trailer to the tractor 22, shown in dotted lines. This portion of the main frame has been shown for the purpose of illustration and may be referred to as a conventional structure. The front end of the trailer is supported by the tractor. In the past, the rear end of the trailer was usually supported upon an axle provided with one or more pairs of wheels. At times auxiliary wheels may be mounted in close proximity to the main wheels, so that in the event of a blowout or a flat tire, the trailer is supported upon the auxiliary wheels. The rear wheels that have generally been used in supporting the rear end of the trailer are usually mounted in close proximity to the rear end.

In the preferred embodiment shown herein the main frame is provided with a pair of downwardly projecting brackets 30, one underneath each of the longitudinally extending rail members 12 and 14. These brackets form bearings for a transversely disposed shaft or support 32 forming a pivotal mounting for a bogie frame or a sub-frame 34, consisting of a pair of longitudinally extending frame members 36 and 38 arranged in close proximity to the rails 12 and 14 and projecting upwardly between these members. The sub-frame 34 is positioned between the transverse members 16a and 16b. Member 36 has sliding engagement with rail member 12. Frame member 38 has sliding engagement with respect to rail member 14. Frame members 36 and 38 are free to oscillate about the shaft 32. The front end of the sub-frame 34 is supported upon the front wheels 40 and the rear end is supported upon the rear wheels 42 through suitable mechanisms.

An axle 44, mounted upon suitable springs 46 through shackles 48 and a bracket 50, is non-rotatably mounted underneath the front end of the sub-frame 34. Suitable channel beams 52 may be interposed between the front end of the frame and the spring 46. The length of the sub-frame 34 is preferably so chosen that the wheels 40 are disposed near the geometric center of the load carried on the trailer.

The rear ends of frame members 36 and 38 are tapered at 60 and support transverse channel irons 62 and 64. A plate 66, provided with a boss 68, is secured to the underside of members 62 and 64. The boss 68 is provided with a vertically disposed hole receiving the king bolt 70 passing through an aperture in a boss 72 integral with a pivotally mounted plate 74. This plate 74 is mounted upon a plurality of channel bars 76, fixedly attached thereto by riveting, welding, or in any other suitable manner. The channel bars 76 extend throughout the periphery of the plate 74 and form a rectangular frame providing mounting for the shackles 80 and the brackets 82. The shackles 80 and brackets 82 form supports for the springs 84 supporting the axle 86 having pivotally mounted thereon the wheels 42.

As may best be seen by referring to Figure 5, in the event the tractor turns in one direction or another, the wheels 40 remain parallel to the main frame of the trailer, the bogie wheels 42 shifting or swinging in the direction opposite to the angular position of the tractor 22. This is due to the fact that the vertical axis of the bolt 70 lies ahead of the axle 86, thereby permitting the wheels 42 to swing in the proper relation so as to accommodate turning of the trailer to cause it to follow the tractor without skidding the tires. The sub-frame 34, being nestled between the rails 12 and 14, is always aligned therewith, without placing undue strain upon the shaft 32 and the brackets 30. The sub-frame, although mounted between the rails 12 and 14, has the top thereof somewhat lower than the top of the rails 12 and 14, so as to permit oscillatory movement of the sub-frame to accommodate curvature of the highways, as clearly shown in Figure 6. This arrangement reduces shock to the load caused by bumps and ruts in the highway, in that the main frame travels half of the height through which the wheels 40 or 42 may be raised or lowered. The arrangement of the wheels 40, 42 and the tractor wheels disclosed herein results in equal distribution of the weight on the axle, thereby permitting the maximum load to be carried by the trailer for a given distance between the front and the rear wheels. As may be clearly seen by referring to Figures 1, 2, 3 and 6, the axles of the wheels are substantially equally spaced underneath the load, so that when a uniformly distributed load is carried on the trailer, the load will be divided equally between the several axles. If, for example, state regulations require the spacing of at least twelve feet for maximum load on the wheels, the trailer may be so designed that the distance between the axles is at least twelve feet, thereby permitting the maximum loading on the wheels. By distributing the load equally over the several axles, every axle can be loaded to the maximum allowable load. The use of the bogie wheels in the rear and the fixed axle in the center facilitates control of the trailer. Furthermore, the nestled arrangement of the sub-frame with respect to the main frame permits oscillatory movement of the sub-frame without materially increasing the height of the trailer and without undue stresses being set up in the several mountings for the sub-frame. A platform, shown in dotted lines in Figure 3, may be laid upon the main frame without interfering with the operation of the sub-frame within tolerable limits.

In the preferred embodiment the sub-frame has been mounted between the longitudinal frame members of the main body. For some types of trailers it may be advantageous to mount the sub-frame members on the outside of the main frame members. This depends entirely upon the type of main frame, the arrangement of the sub-frame and the use of the trailer. Furthermore, it may be influenced by the width of the road bed, the spacing of the wheels and the like.

In the preferred embodiment the wheels are mounted on axles, all of which are substantially the same length. The bogie wheels, mounted under the sub-frame, may be mounted on a much shorter axle. Instead of showing two pairs of wheels on each axle, a single pair or more pairs of wheels could be used. Likewise, instead of using two pairs of wheels on the bogie truck, a single wheel might be used, functioning in a manner similar to a castor. The bogie truck need not necessarily be mounted on a king bolt projecting through a round aperture. The bogie wheels could be mounted in a manner similar to that disclosed in my Patent No. 2,333,853, patented November 9, 1943.

The sub-frame has been shown as nestled with respect to the main frame. The sub-frame need not necessarily be rectangular and it need not necessarily be nestled. It may be guided by the pivotal support, or guides may be used adjacent one or both ends to give the necessary strength and rigidity, so that instead of a nestled arrangement, the sub-frame oscillates between guides. The sub-frame should preferably have sufficient rigidity so as to prevent undue flexing thereof. If necessary, diagonal bracing may be used.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a transportation vehicle, a main body including a pair of longitudinally extending frame members, a sub-frame including a pair of longitudinally extending frame members, means for pivotally mounting the sub-frame to the main body, the frame members of the main body and the frame members of the sub-frame having sliding contact with each other when one set of frame members oscillates with respect to the other set of frame members, two sets of wheels for supporting the sub-frame, an axle non-rotatably mounted with respect to the sub-frame, said axle being mounted in front of the pivotal means and having mounted thereon one set of wheels, a second axle mounted underneath the rear of the sub-frame, means for attaching the second axle to the sub-frame, said means including a pivotal mounting permitting rotation of the rear axle about a vertical pivot, said second axle having mounted thereon the other set of wheels, said sub-frame having oscillatory movement about the pivotal means when the wheels travel over irregularities in the highway.

2. In a transportation vehicle, a main body, guide means, a sub-frame including longitudinally extending frame members contacting the guide means, means for pivotally mounting the sub-frame to the main body, said pivotal means permitting oscillation of the sub-frame in a plane parallel to the longitudinal axis of the main body, two sets of wheels mounted underneath the sub-frame, one of which sets is mounted in front of the pivotal means, another set of wheels mounted to the rear of the pivotal means and adapted to oscillate about a vertical pivot offset from the axis of said other set of wheels, said sub-frame oscillating about the pivotal means when the wheels travel over irregularities in the highway, said sub-frame being guided by said guide means when oscillating.

3. In a transportation vehicle, a main body including longitudinally extending frame members, a sub-frame including guide means contacting the longitudinally extending frame members of the main body, means for pivotally mounting the sub-frame to the main body, said pivotal means permitting oscillation of the sub-frame in a plane parallel to the longitudinal axis of the main body, two sets of wheels mounted underneath the sub-frame, one of which sets is mounted in front of the pivotal means, another set of wheels mounted to the rear of the pivotal means and adapted to oscillate about a vertical pivot offset from the axis of said other set of wheels, said sub-frame oscillating about the pivotal means when the wheels travel over irregularities in the highway, said sub-frame being guided by said guide means when oscillating.

4. In a transportation vehicle, a main body, guide means, a sub-frame including longitudinally extending frame members contacting the guide means, means for pivotally mounting the sub-frame to the main body, said pivotal means permitting oscillation of the sub-frame in a plane parallel to the longitudinal axis of the main body, a set of wheels mounted underneath the front end of the sub-frame, the axle of said set of wheels remaining substantially normal to the longitudinal axis of the main body at all times, and at least one bogie wheel mounted underneath the rear end of the sub-frame so that the sub-frame may oscillate about the pivotal means when the wheels travel over irregularities in the highway, said sub-frame being guided by said guide means when oscillating.

5. In a transportation vehicle, a main body including longitudinally extending frame members, a sub-frame including guide means contacting the longitudinally extending frame members of the main body, means for pivotally mounting the sub-frame to the main body, said pivotal means permitting oscillation of the sub-frame in a plane parallel to the longitudinal axis of the main body, a set of wheels mounted underneath the front end of the sub-frame, the axle of said set of wheels remaining substantially normal to the longitudinal axis of the main body at all times, and at least one steerable bogie wheel mounted underneath the rear end of the sub-frame so that the sub-frame may oscillate about the pivotal means when the wheels travel over irregularities in the highway, said sub-frame being guided by said guide means when oscillating.

6. In a transportation vehicle, a main body including a portion functioning as guide means, a rigid sub-frame including a portion functioning as guide means cooperating with the guide means of the main body to maintain the sub-frame in longitudinal alignment with the main body, means for pivotally mounting the sub-frame to the main body, said sub-frame being mounted upon wheels including a pair of wheels mounted at one end of the sub-frame and a bogie truck including a steerable bogie wheel mounted at the other end of the sub-frame, said sub-frame oscillating about the pivot to accommodate irregularities in the highway.

JOHN PHIL FELLABAUM.

REFERENCES CITED

The following references are of record in the file of this patent:

UNITED STATES PATENTS

| Number | Name | Date |
|---|---|---|
| 1,375,892 | Black | Apr. 26, 1921 |
| 1,647,437 | Crocker | Nov. 1, 1927 |
| 2,359,299 | Brown | Oct. 3, 1944 |
| 650,818 | Buchanan | June 5, 1900 |
| 2,333,853 | Fellabaum | Nov. 9, 1943 |
| 2,135,291 | Pinard | Nov. 1, 1938 |

FOREIGN PATENTS

| Number | Country | Date |
|---|---|---|
| 6,014 | Australia | Feb. 18, 1927 |
| 32,930 | Denmark | Feb. 26, 1924 |
| 327,585 | Italy | July 16, 1935 |